United States Patent [19]

Ziccardi et al.

[11] Patent Number: 4,643,251
[45] Date of Patent: Feb. 17, 1987

[54] TRACTION DEVICES FOR AUTOMOTIVE WHEELS

[76] Inventors: Philip Ziccardi, 1700 New Haven Ave., Pittsburgh, Pa. 15216; John Ziccardi, R.D. 1 Marshall Rd., Evans City, Pa. 16033

[21] Appl. No.: 695,798

[22] Filed: Jan. 28, 1985

[51] Int. Cl.$^4$ .................. B60C 27/14; B60C 27/00
[52] U.S. Cl. .................. 152/223; 152/225 R; 152/226; 180/16; 192/14; 192/90
[58] Field of Search ............ 152/225 R, 225 C, 226, 152/223, 220, 208, 213 R, 213 A, 214, 217, 218, 216; 192/14, 101, 90, 84, 4 A; 188/31, 60, 69, 187, 71.2; 180/16

[56] References Cited

U.S. PATENT DOCUMENTS 2,720,237 10/1955 Chamberlain .................. 152/214
2,948,319 8/1960 Cannella .................. 152/214
4,180,115 12/1979 Yamagishi .................. 152/225 R X

*Primary Examiner*—Michael Wityshyn
*Assistant Examiner*—Thomas Bokan
*Attorney, Agent, or Firm*—William J. Ruano

[57] ABSTRACT

A wheel attachment to provide extra needed traction by a motor drawn vehicle when traveling on roadways covered with snow, ice or mud. It comprises a plurality of circularly spaced, flexible traction members overhanging the tread of a pair of wheels and control means operable from the driving position of the vehicle to selectively couple or uncouple the attachment relative to the wheels. The control means may comprise a driver's switch for operating an electromagnetically operated pin on the traction device cooperable with a hole in a disc rotatably mounted on a spindle at each wheel to selectively couple the device operatively to the hub at the respective wheel. Other alternative means are provided to control such coupling.

5 Claims, 23 Drawing Figures

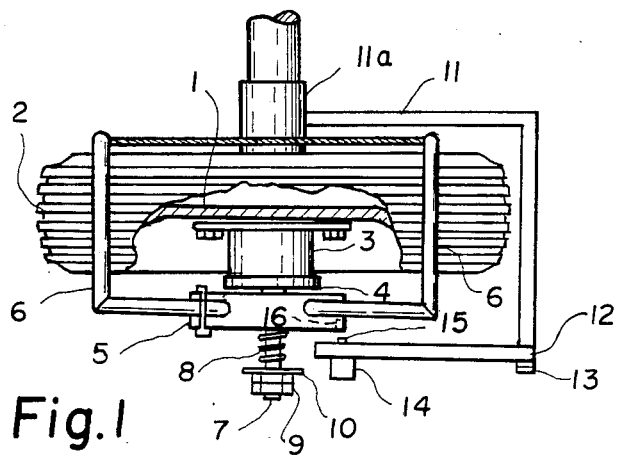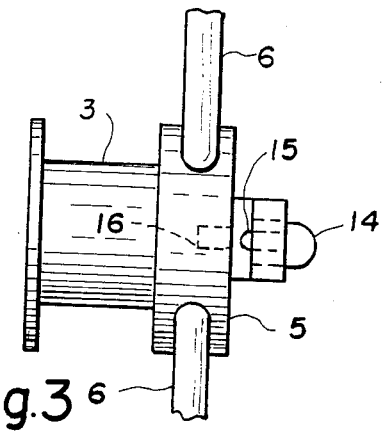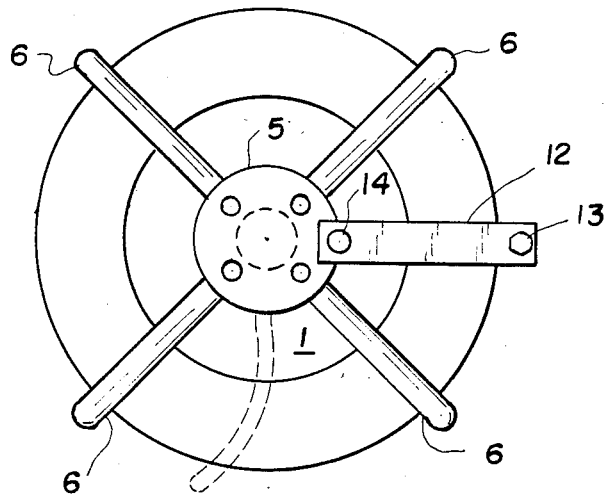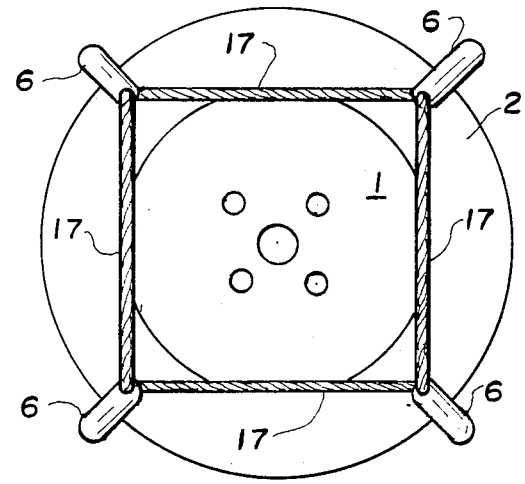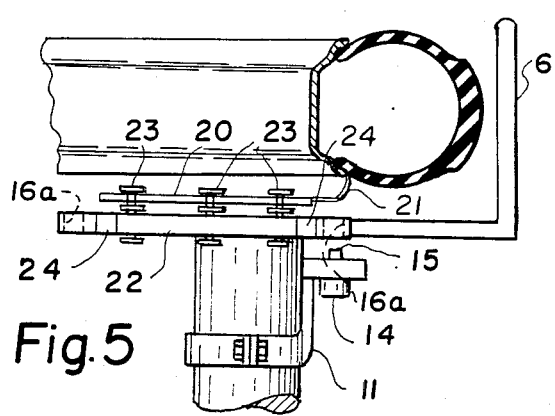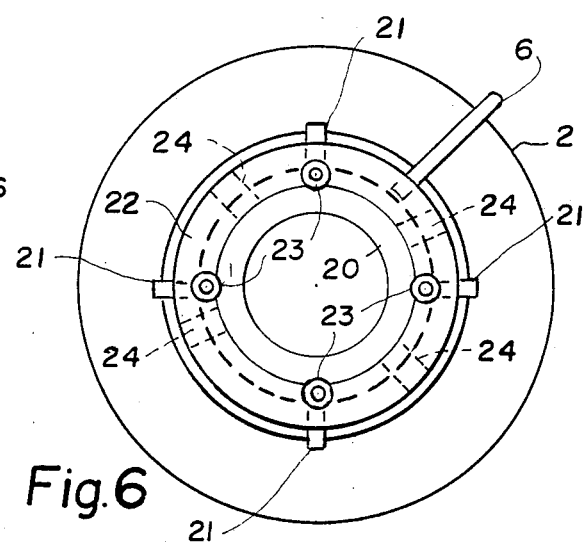

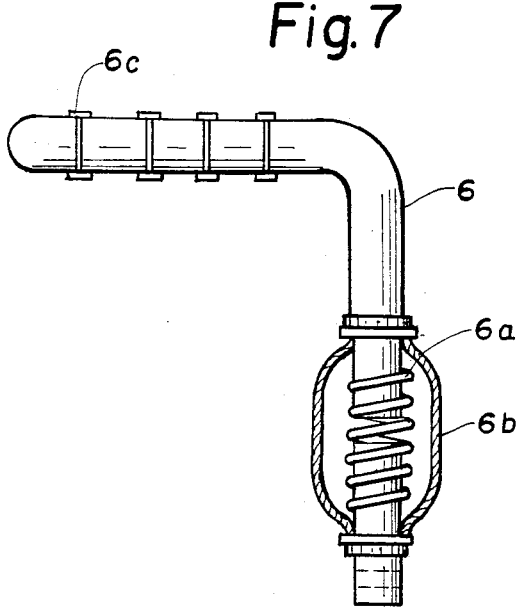
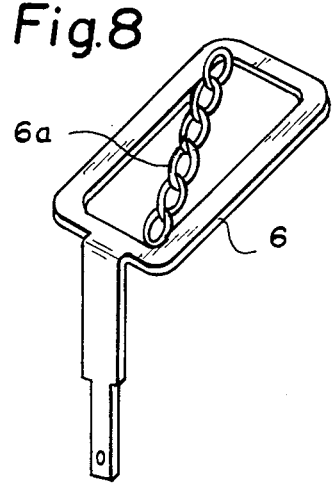
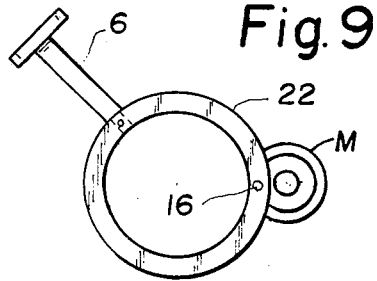
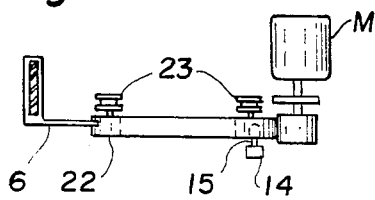
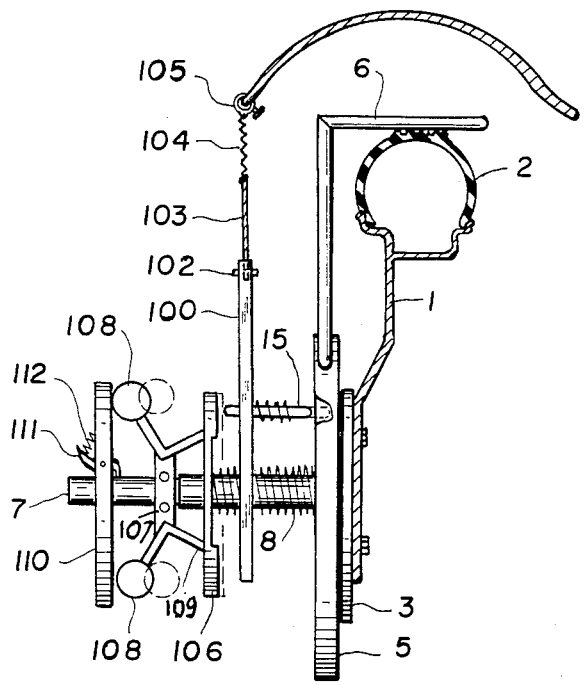

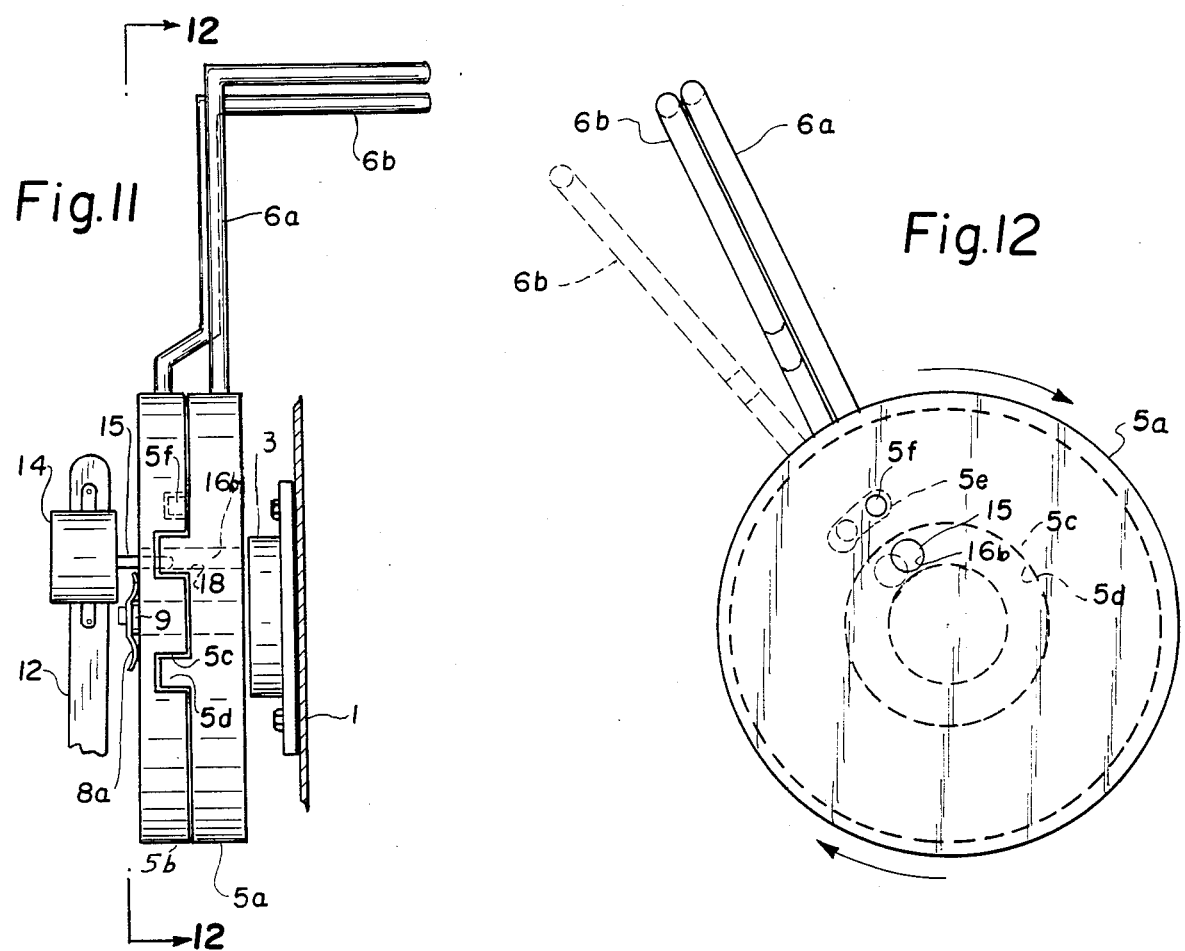
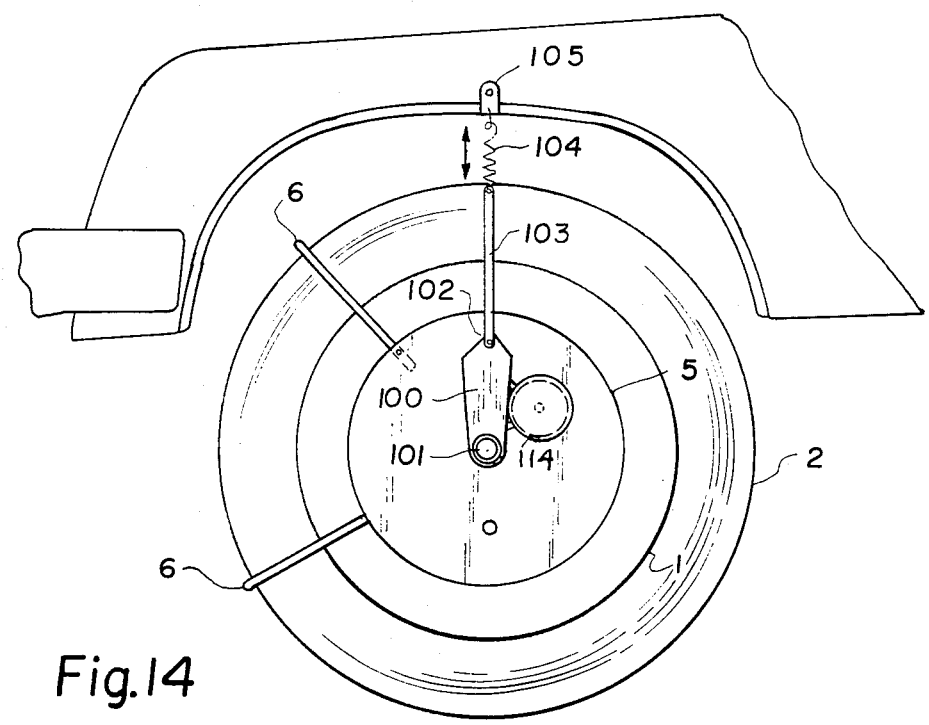

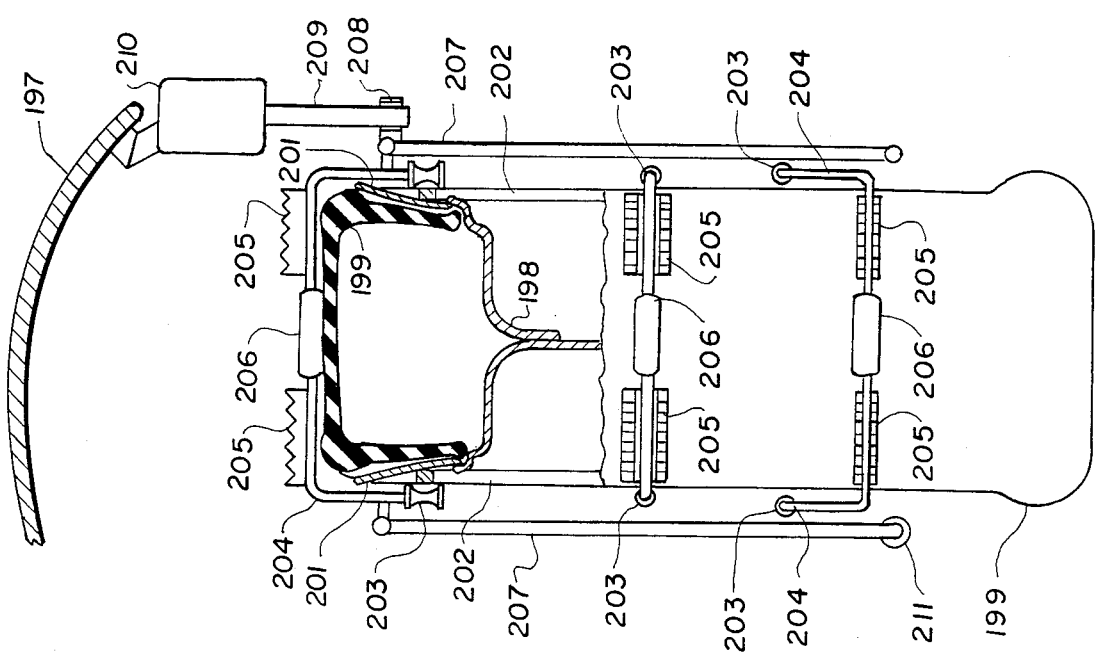
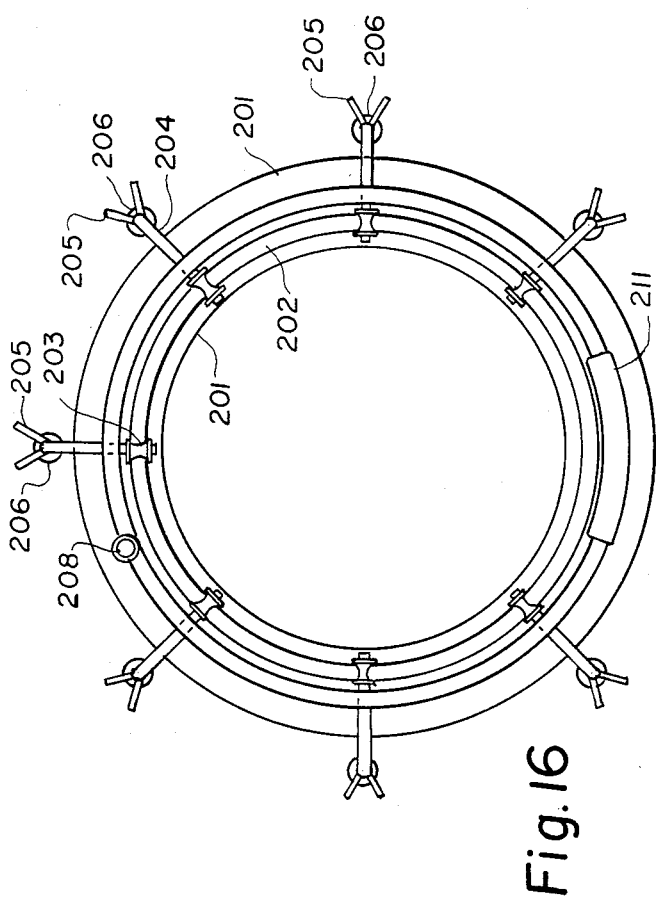
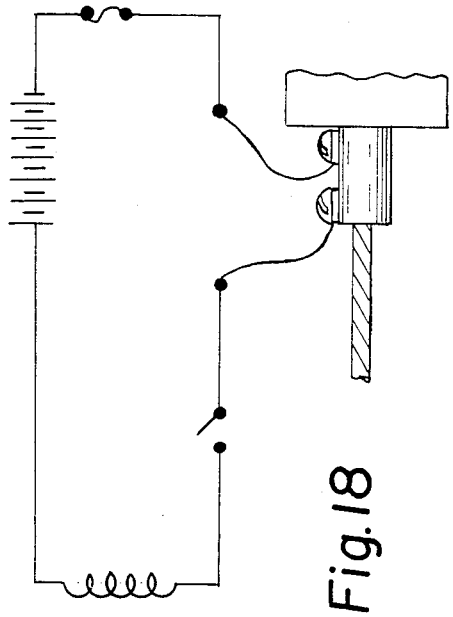

TRACTION DEVICES FOR AUTOMOTIVE WHEELS

This invention relates to a wheel attachment to provide extra traction needed by a motor driven vehicle when traveling on roadways which are covered with snow, ice or mud.

Such attachment is of special interest for use on passenger cars, ambulances, fire trucks, police cars, school buses, etc.

An outstanding disadvantage of conventional attachments for providing extra traction is the difficulty of applying and removing the attachment, also the lack of effectiveness and lack of ease of control.

An object of the invention is to provide an attachment overcoming the above-named disadvantages.

One of the specific objects and unique advantages of the invention is the ability to activate or de-activate the traction members by merely flipping an electrical switch which is mounted on the instrument panel of the vehicle.

Other objects and advantages of the invention will become more apparent from a study of the following description taken with the accompanying drawing wherein:

THE DRAWINGS

FIG. 1 is a top plan view of a traction device attached to a vehicle wheel and embodying the present invention;

FIGS. 1a, 1b, 1c, and 1d are enlargements and modifications of certain parts of FIG. 1;

FIG. 2 is a side elevation view of the outboard side of wheel and devices of FIG. 1;

FIG. 3 is an enlarged drawing of some of the parts shown in FIGS. 1 and 2;

FIG. 4 is a side elevation of the inboard side of the wheel of FIGS. 1 and 2;

FIG. 5 is a top plan view of another embodiment of the invention involving the same concepts in general;

FIG. 6 is a side elevation of the inboard side of the wheel shown in FIG. 5;

FIG. 7 is a specialized form of the traction members which can be used with either of the illustrated forms of the invention;

Figure 1A:
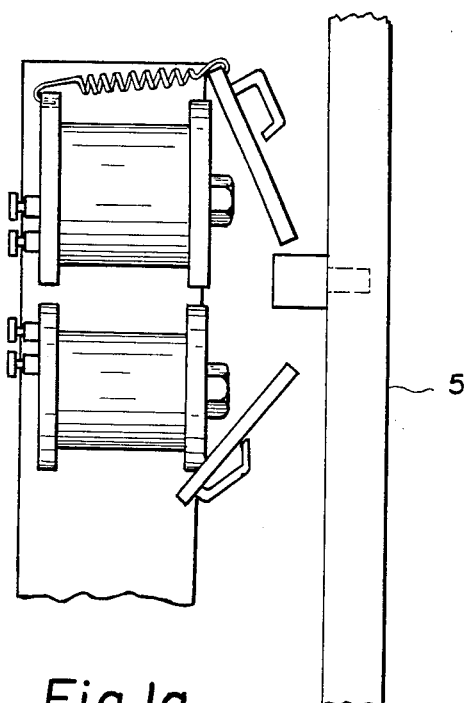

FIG. 8 refers to a drawing of yet another form of traction member in which conventional pieces of tire chain can be incorporated in the wearing surface of the traction member. It is made of a flexible material such as polyurethane having an open portion across which is stretched a short length of chain.

FIG. 9 is a side elevation;

FIG. 10 is a side view thereof and of a possible variation of the invention;

FIGS. 11, 12, 13, 13a, and 14 are modifications;

FIG. 15 is an elevation which illustrates a method of automatically controlling the devices of FIG. 1 by means of a centrifugal coupler.

FIGS. 16 and 17 show a different kind of traction device controlled by the same solenoid that is used for the invention as shown in FIG. 1, FIG. 16 being a side view taken on the right of FIG. 17 with the tire 199 omitted; and, FIG. 18 shows an electrical circuit including a speed-sensitive switch to control the various traction devices.

Referring to FIGS. 9 and 10, an electric motor M drives the ring 22, instead of mechanical friction as in FIG. 1, or magnetic coupling as in FIG. 6.

It is possible to use only one traction member (of the type illustrated in FIG. 8 for example) and still get the traction necessary to climb a hill or to bring the vehicle to a safe stop. This is so because the traction member will turn very rapidly and would place the traction member at the interface of the tire and roadway several times a second. The slip-clutch would allow the traction member to be trapped between the tire and road without causing undue stress on the electric motor or other parts of the apparatus.

An electrical make-or-break switch controls the current to both the motor and the solenoid, at the same instant, so that when the motor is energized, the solenoid is energized which causes the pin 15 to be withdrawn from the hole 16 of the ring 22 and thereby allowing the ring (with the traction members attached) to rotate. When extra traction is no longer needed, the switch is thrown and the motor will not exert power on the ring any longer, and at the same time, the solenoid is de-energized allowing the spring-loaded pin 15 to enter the hole 16 of the ring 22 so that the traction member (or members) come to a stop at a position clear of the roadway.

DETAILED DESCRIPTION

With reference to FIGS. 1, 2, 3, and 4, numeral 1 designates a conventional automobile wheel and numeral 2 designates a conventional tire shown cut-away.

Attached to the wheel by the wheel lugs and nuts is hub 3 having a spindle 7 protruding therefrom. Rotatably mounted on the spindle 7 is a disc 5 from which radiates a plurality of flexible traction members 6, said disc being pressed against the hub 3 by helical spring 8, so that friction occurs between the disc 5 and the hub 3. The friction between the disc and the hub will cause the disc to rotate at, or nearly at, the speed which the wheel turns. The traction members 6 are joined by cable 17 to hold the traction members in position relative to each other, especially at high rotation speeds such as are encountered when trying to move the vehicle out of a rut. The spring 8 is kept compressed by the locknuts 9 and washer 10.

A rigid arm 11 which is firmly attached to the wheel axle of the vehicle at 11a has on its outboard side, a solenoid 14, said solenoid having a spring-loaded iron pin 15 slidably mounted inside the core. The pin 15 has a Teflon coating at its pointed end.

The pin 15 is positioned so as to be in alignment with the rotary path of a hole 16 in the disc 5 so that when the solenoid is not energized, the pin 15 will press into the hole 16 (which has a Teflon sleeve within it) because of the spring within the solenoid, and this action will cause the disc 5 to stop rotating and cause the traction members to come to rest clear of the roadway even though the wheel continues to rotate.

When the solenoid 14 is energized, the pin 15 will be drawn out of the hole 16 and the disc 5 and the attached traction members 6 will rotate with the wheel because of the friction between the disc 5 and the hub 3.

FIGS. 1a, 1b, 1c and 1d are enlargements and modifications of certain parts of FIG. 1. FIG. 1a shows two electromagnets having spring-loaded "ears". When the electromagnets are not energized, they keep the disc (5 of FIG. 1) from revolving because the "ears" are in their extended position, at which position they engage a dowel or pin which is integral with the disc 5. When the electromagnets are energized the "ears" are drawn to the iron core of the electromagnet and thus they clear the pin or dowel and the disc is free to revolve with the automobile wheel.

Figure 1B:
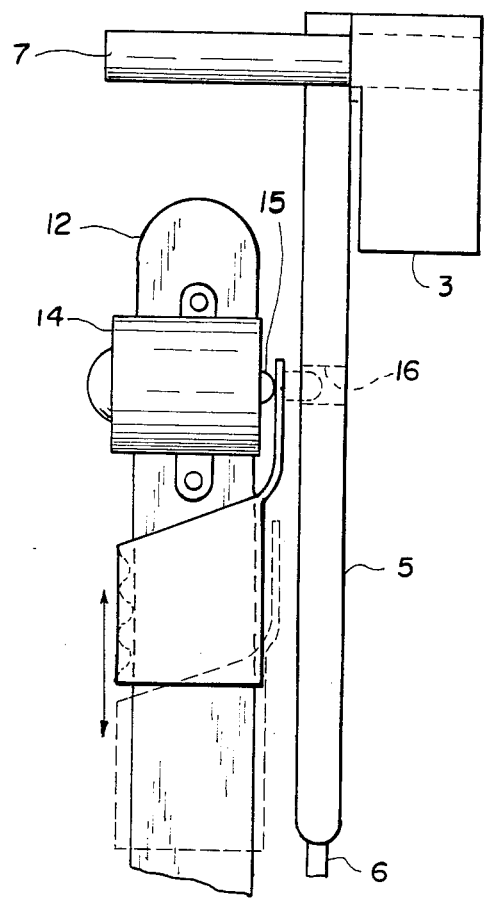

In FIG. 1b, a manual over-ride is provided to lock the pin (15 of FIG. 1) in the retracted position in the event the solenoid of FIG. 1 should fail. In order to use the over-ride, it is necessary to push the pin out of the hole (16 of FIGS. 1 and 3) and then slide the finger of the catch so that it is interposed between the pin 15 and the hole 16.

Figure 1D:
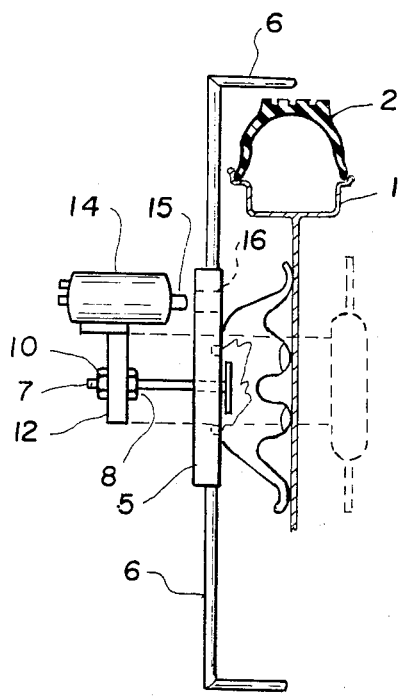
Figure 1C:
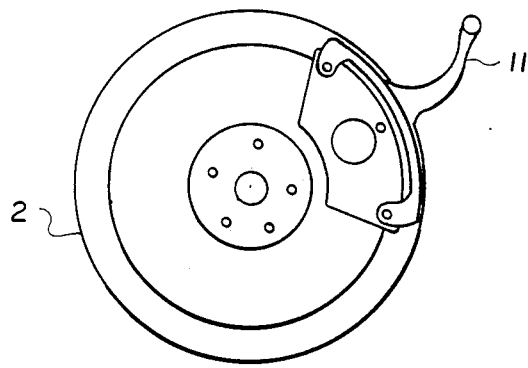

FIG. 1c shows how to attach the support arm (11 of FIG. 1) to the caliper part of a disc brake such as is used on current front-wheel drive autos. We intend to attach a full scale working model to the front wheels of a 1979 Oldsmobile. We will make two specially altered bolts to substitute for the conventional caliper bolts. The special bolts will firmly affix the support arm of FIG. 1 to the caliper and they will also function to hold the caliper together as the conventional caliper bolts do.

FIG. 1d shows a modification of the invention which consists of a spindle 7 which is rigidly affixed to the support arm 11 and 12 of FIG. 1. Note that the spindle is not connected to the wheel in any way. This spindle has the disc 5 mounted on it, said disc having riveted to it a star-shaped pressure plate which is made of a flexible plastic so that there is frictional engagement of the disc 5 with the wheel of the auto. When the disc is restrained (by the insertion of the pin 15 into the hole 16) there is still friction between the star-shaped pressure plate and the auto wheel but the traction members 6 will be at rest at the side of the wheel. When the solenoid is energized, the pin 15 is retracted from the hole of the disc and the disc will turn because of the friction between the pressure plate and the auto wheel.

FIGS. 5, 6 and 7 are a different version of the invention which can be used on any auto, but particularly suited for frontwheel drive vehicles. (Because of the equivalent of support arm 11 of FIGS. 1, 2, 3 and 4, likewise denoted by numeral 11 in FIG. 5, would be affixed to the wheel, hub or spindle, or caliper of the disc type brake as shown in FIG. 1c, and would turn with the steering wheels).

Attached to the wheel 1, by clips 21, is a ring 20 of magnetic material such as steel. An aluminum ring 22 is held alongside of ring 20 by flanged rollers 23, the axles of the rollers being attached to the aluminum ring 22, and the flanges of the rollers 23 engaging the ring, 20.

The aluminum ring has affixed to it several traction members 6 which rotate with the wheel, due to the attraction between the steel ring 20 and permanent magnets 24 which are embedded in the aluminum ring 22, said ring having a hole 16a in it which is in alignment with the pin 15 of a solenoid 14 the same as described with regard to FIGS. 1, 2, 3 and 4.

The action of the solenoid and the related pin and hole is the same as described in the first system described earlier.

FIG. 7 shows a special form of traction member, which may be made of any one of many plastics or metals, either in solid or tubular form.

The spring 6a would allow the member to flex (of need in the event of a flat tire), and the thin cable 6b would limit the axial movement of the member.

6c indicates studs which are on both surfaces of the traction member.

FIGS. 11 and 12 show an embodiment of the invention which uses twice as many traction members,—there being four on each of the two discs (disc 5a and disc 5b). A hub 3 attached to the wheel 1 is in slidable engagement with disc 5a. The discs are pressed against each other, and the hub, by the force exerted by the Belleville spring 8a.

Disc 5b has a short elongated groove 5e, into which a round protrusion 5f, on disc 5a, is free to move in an arcuate path, the limits of the path being defined by the arcuate groove. The disc 5a also has a circular ridge 5d which engages a circular groove 5c. The circular ridge 5d of disc 5a has a hole 16b, and the circular groove 5c of disc 5b has a similar hole 18. The two holes are engaged by the pin 15 of the solenoid 14. Because the pin 15 of the solenoid 14 moves only one-half inch, it is necessary to use the ridge 5d and groove 5c to enbale both discs to be arrested by the pin 15 when the solenoid 14 is not energized (the pin 15 is spring-loaded so that only when the solenoid is energized, the pin 15 is retracted from the holes 16b and 18).

In operation, assuming that the vehicle to which the device is installed is moving on a clear ice-free road, then the traction members are at the stored position with the contact portion of the tire turning on the roadway and the traction members well above the road. Upon approaching an icy stretch of road, the driver would flip an electrical switch, thus energizing the solenoid 14 which would cause the pin 15 to the drawn into the solenoid and thereby coming out of the hole 18 and the hole 16b. Because the Belleville spring 8a is constantly forcing the discs 5a and 5b against each other, and against the hub 3, the discs (with the traction members) will turn with the wheel. Said traction members pass between the tread of the tire and the road and thereby afford more traction of the wheels.

At any time, the driver may flip the electrical switch to the "off" position, de-energizing the solenoid, and the pin 15 will engage the hole 18 of disc 5b and a split-second later the said pin will engage the hole 16b of disc 5a. It must be noted that as the both discs turn the traction member 6b will move away from traction member 6a due to inertia and the rotation of the wheel, thus spacing the traction members apart. There would be a total of eight traction members (only two traction members are shown in the drawing).

Figure 13A:
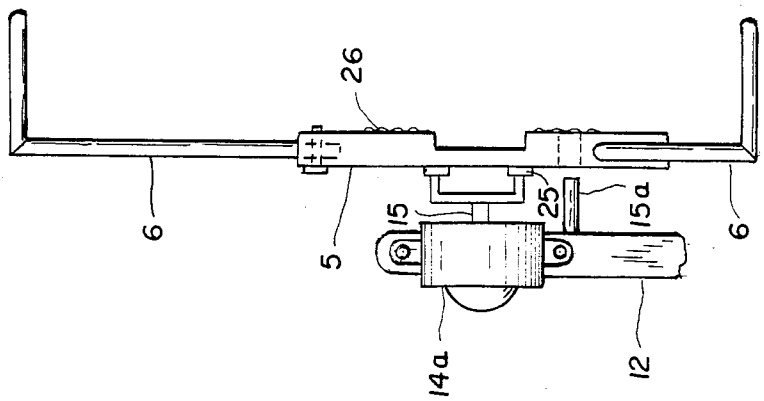
Figure 13:
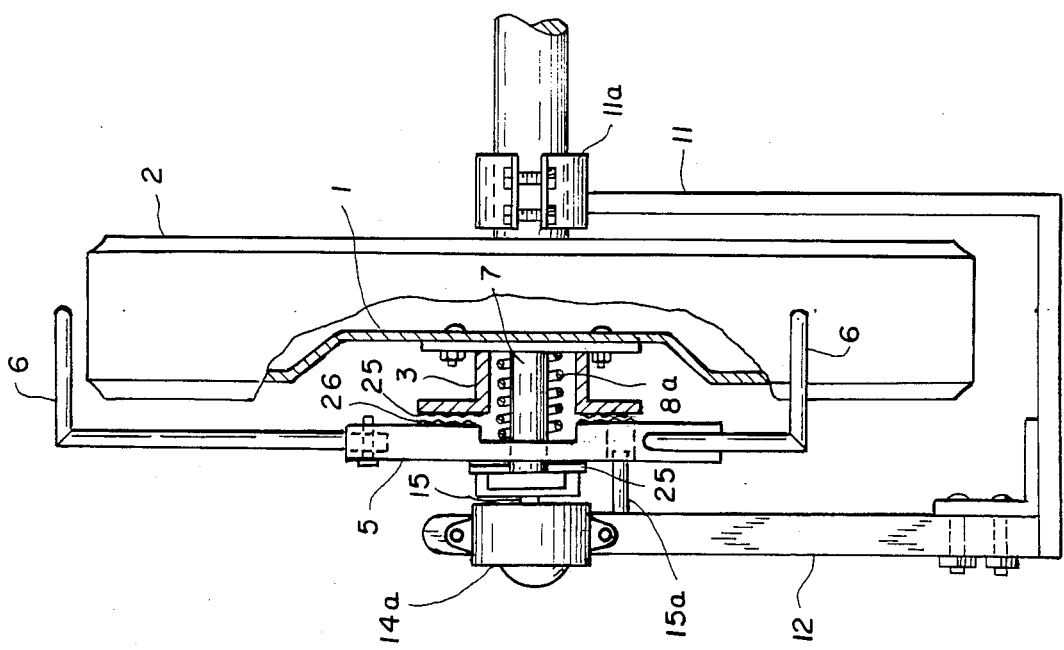

FIG. 13 shows a modification for autos, buses and trucks. The devices in this modification are arranged in a different manner and work in a different way.

To begin with, the devices of the previous drawings, FIGS. 1 through 6, all relied upon slidably engaged friction-driven discs. This modification uses a solenoid to force engagement of a toothed disc with toothed hub, wherein the solenoid upon being energized, causes the traction members to come into play, and when de-energized, causes the traction members to come to inoperative position. (The spring loading of the solenoid core is opposite to that of FIG. 1).

In this arrangement, the hub 3 having a toothed face 25 is held in alignment with the disc 5, having a toothed inner face 26, by being slidably mounted on the spindle 7 which is affixed within the recessed hub. Slidably engaged on the spindle is a compression spring 8a which urges the disc 5 against the thrust ball-bearing 25a, said spring 8a being stronger than the spring force within the solenoid and therefore the disc 5 and the hub face 25 are kept out of contact. As long as the solenoid is not energized, the spring 8a will keep the disc axially spaced away from the hub face 25 and said spring force will cause the disc 5 to engage pin 15a which is welded to the solenoid support 12, the function of the pin being to stop the disc in a predetermined position, that being the position where the traction members 6 are clear of the roadway. When the solenoid is energized, the disc 5 engages the hub 3, thereby causing the traction members to turn with the wheel.

FIGS. 14 and 15 show an automatic modification of the invention. There is firmly affixed a collar 107 onto the spindle 7, said collar having rigid levers 109 which are pivotally moveable on said collar, one end of the levers 109 rests in sliding engagement against a large rotatable ring 106, the other end of each of the levers 109 terminates in a weighted ball 108 which can be made of lead of Kennertium. A pin 15 is slidably affixed in the plate 100 which is secured to the fender of the automobile by a cable 103 and heavy extension spring 104. A fluid cylinder may be substituted for the cable and spring.

The plate 100 is held in tension between its bearing on the spindle 7 and fender of the vehicle. The outer end of the pin 15 is in sliding engagement with an axially moveable collar 106. A latch 111, tensioned by spring 112, attached to collar 110 which is axially movable inwardly on the spindle 7 and locked in place by latch 111 by engaging one of the two holes in the spindle 7, thereby locking the weights in their extended position and pin 15 is then engaged in the hole of disc 5, thereby locking the traction members 6 in their non-operating position.

This mechanism uses the effect of centrifugal force which causes the levers 109 to push collar 106 inwardly, said collar pushing pin 15 into the hole in the disc 5 (non-operating traction members).

This arrangement can be used as a strictly manually engaged mechanism that will operate automatically thereafter, once engaged. For example: as a driver starts to work on a snowy morning, he will engage the latch 111 into the hole furthest from the collar 107, thus allowing free movement of the weights 108 which effects the movement of the collar 106 and pin 15 in response to the varying speed of the rotation of the automobile wheel (and the spindle 7 to which it is attached). At speeds of 0 to 25 miles per hour, 300 RPM of spindle 7, the pin is not engaged in the hole in the disc 5, therefore the disc 5 is free to turn with its attached traction members, affording extra traction. At speeds of above 25 miles per hour, the weights, due to centrifugal force, would be in their extended position, thus moving collar 106 (and the pin 15 into the hole of disc 5), thus locking the traction members in the non-operating position.

This automatic mechanism can be used alone or as an integral part of the invention as shown in FIG. 1.

A further modification (FIG. 18) involves using the pressure-sensitive switch which would be attached to the automatic transmission or a speed-sensitive switch working off the speedometer cable of a manual transmission of a vehicle. This switch would be connected in series with the on/off switch on the dashboard. The speed-sensitive switch can be used to prevent the solenoid from being energized at high speeds of the vehicle. The arrangement would prevent the stopping of the disc 5 at high speeds, which could cause damage due to the high inertia impact of the stop on the disc and the solenoid pin. To clarify—a driver could switch the traction devices on at any speed, but if he or she switched the circuit embodying the present invention off, at speeds above 20 MPH, the speed-sensitive switch would remain open until the vehicle slowed down to 20 MPH, then the speed-sensitive switch would close and thus the electrical circuit to the solenoid would be closed and then the traction members would come to rest in the non-operating position.

Yet, another extra-traction mechanism is illustrated by FIGS. 16 and 17. This concept embodies a "traction squirrel cage" which is a wheel attachment comprised of two flexible polyurethane rings 201, one on each side of the tire 199 of a conventional automobile wheel 198. Said rings are gripped between the rim of the wheel and the bead of the tire. The rings 201 each have a raised rib 202 which is engaged by a flanged roller 203. Attached to axles 204 of the rollers 203 are traction cleats 205. Also on the axle 204, is an elongated roller 206, said roller rolls upon the wearing surface of the tire at all times, when the traction members are in operating condition or when the traction members are in the non-operating condition.

A smaller ring 207 is attached to each of the axles 204 so that the rollers 203 are kept in spaced relationship to each other. A balancing weight 211 is attached to ring 207 to compensate for the cleats 205 and rollers 206. A stop pin 208 protrudes from the ring 207, said stop pin engages a solenoid pin 209 (only when the solenoid is not energized) so that the ring 207 (with the traction members attached) does not turn with the tire. The traction cleats surround only the upper substantially semi-circular portion of the tire.

When the solenoid 210 is energized, the pin 209 is retracted away from the path of the stop pin 208 allowing the ring 207, with its tractions members, to turn with the tire (because there is enough friction between the rollers 206 and the tire 199) and engage the road surface.

When the "squirrel cage", composed of the ring 207, the rollers 203, the axles 204, and the rollers 206, turns with the tire, the cleats 205 pass between the tire and the roadway and thereby afford extra grip.

While we have illustrated and described several embodiments of our invention, it will be understood that these are by way of illustration only and that various changes and modifications may be contemplated in our invention and within the scope of the following claims.

We claim:

1. A traction device for mounting on a vehicle wheel, comprising a hub detachably mounted concentrically on said wheel, said hub having a spindle protruding outwardly therefrom, a disc rotatably mounted on said spindle and from which radiates a plurality of circularly spaced, flexible traction members overhanging the tread of the wheel, an electromagnetically operated pin mounted on a support arm of said traction device and cooperable with a hole in said disc in the rotary path of said pin to selectively couple said support arm of said traction device to the disc to prevent rotation of said disc and traction members to maintain the traction members in inactive position, said electromagnetically operated pin including a solenoid having said support arm attached to the axle of said wheel, and control means including a switch operable from the driving position of the vehicle and arranged to selectively energize said solenoid and electromagnetically operate said pin to selectively uncouple said support arm of said traction device from the disc to allow said disc and traction members to rotate with said hub and thereby activate said traction members.

2. A traction device as recited in claim 1 together with a cable for tying the extremeties of said traction members together behind said wheel.

3. A traction device for mounting on a vehicle wheel, comprising a hub detachably mounted concentrically on said wheel, said hub having a spindle protruding outwardly therefrom, a disc rotatably mounted on said spindle and from which radiates a plurality of circularly spaced, flexible traction members overhanging the tread of the wheel, a centrifugal force operated pin mounted on a support plate of said traction device and cooperable with a hole in said disc in the rotary path of said pin to selectively couple said support plate of said traction device to the disc to prevent rotation of said disc and traction members to maintain said traction members in inactive position, said centrifugal force operated pin including centrifugal force operated means which allows an axially movable collar to selectively uncouple said support plate of said traction device from the disc to allow said disc and traction members to rotate with said hub and thereby activate said traction members.

4. A traction device as recited in claim 3 wherein said pin is slidably supported on said plate coaxially mounted on said wheel, and an extensible cable interconnecting said plate with a fender of said vehicle.

5. A traction device as recited in claim 3 wherein said centrifugal force operated means includes levers having balls at the outer ends which slide said collar mounted on said axle to operate said pin.

* * * * *